United States Patent
Stegmeier et al.

[15] 3,639,134
[45] Feb. 1, 1972

[54] PROCESS FOR TREATING THE SURFACE OF A STRETCHED FILM

[72] Inventors: Gerhard Stegmeier, Mainz-Weisenau; Helga Lenhart, Wiesbaden; Horst Gebler, Wiesbaden-Bierbrich; Horst Diener, Frankfurt-Hochst, all of Germany

[73] Assignee: Kalle Aktiengesellschaft, Wiesbaden-Biebrich, Germany

[22] Filed: June 4, 1969

[21] Appl. No.: 830,505

[30] Foreign Application Priority Data

June 6, 1968 Germany..................P 17 69 534.0
July 29, 1968 Germany..................P 17 69 872.5

[52] U.S. Cl. ...............................117/7, 117/47 A, 117/93.1, 117/138.8 E, 117/138.8 F

[51] Int. Cl. ........................................B44d 5/04, B32b 27/32
[58] Field of Search................117/7, 138.8 F, 138.8 E, 47 A, 117/93.1 CD, 122 H; 204/165, 168; 250/49.5 TC

[56] References Cited

UNITED STATES PATENTS

| | | | |
|---|---|---|---|
| 3,030,290 | 4/1962 | Ryan | 117/138.8 X |
| 3,088,844 | 5/1963 | Hungerford et al. | 117/47 |
| 3,309,299 | 3/1967 | Mantell | 204/165 |
| 3,403,042 | 9/1968 | Stead | 117/7 |

*Primary Examiner*—William D. Martin
*Assistant Examiner*—Theodore G. Davis
*Attorney*—James E. Bryan

[57] ABSTRACT

This invention relates to a process for treating the surface of a stretched film of a polyester or polypropylene or copolymers or polymer mixtures of the latter containing at least 60 percent by weight, calculated on the total polymer weight, of propylene, in order to improve the adhesion of the film surface to a heat-sealable coating, which comprises subjecting the film surface to a corona discharge in an atmosphere consisting essentially of nitrogen or carbon dioxide containing not more than about 15 percent by volume of oxygen, at a film temperature in the range of room temperature to about 25° to 50° C. below the softening point of the stretched film. The invention also relates to the films so treated.

7 Claims. No Drawings

PROCESS FOR TREATING THE SURFACE OF A STRETCHED FILM

This invention relates to a process for treating the surface of a stretched film of polypropylene, or copolymers or polymer mixtures thereof containing at least 60 percent by weight, calculated on the total polymer weight, of propylene, or of polyesters, such as polyethylene terephthalate. Especially, the film is a biaxially stretched film of isotactic polypropylene which is treated to improve the adhesion of a heat-sealable coating, particularly one containing one or more polyvinylidene chloride copolymers, by means of a corona treatment at room temperature or at an elevated temperature in the presence of gases.

It is known that a layer of a polyvinylidene chloride copolymer has an unsatisfactory adhesion to an untreated surface of a stretched film of materials of the aforementioned type, particularly when the layer has been applied from an aqueous dispersion. Pretreatment methods have thus been employed, of which two types have been widely accepted, viz, the activation of the surface by means of a flame treatment and the activation of the surface by means of a corona treatment.

Corona treatment generally is effected in an atmosphere of air and/or a halogen. It is also known in the case of a corona discharge in an atmosphere of air to improve the adhesion by raising the temperature. However, the improvements are insufficient for most fields of application, particularly when the discharge is effected at medium frequencies. Improved adhesion values useful for practical application are achieved by the corona treatment in the presence of halogens. In addition to the increased reactivity, the toxicity, and the odor, this pretreatment involves numerous further disadvantages, however. Considerable equipment is necessary for sealing off and destroying the gas. Furthermore, particularly when working at elevated temperatures, considerable corrosion of the apparatus occurs so that the process technically can be performed only with difficulties.

The present invention overcomes the aforementioned disadvantages and provides a process for improving the adhesion to a heat-sealable coating of the surface of a stretched film of polypropylene, or copolymers or polymer mixtures thereof, having at least 60 percent by weight, calculated on the total polymer weight, of propylene, or of polyesters, such as polyethylene terephthalate, particularly, however, a biaxially stretched film of isotactic polypropylene.

This is achieved by performing a corona treatment of the film surface at room temperature or at an elevated temperature in the presence of gases. In the process of the invention, the corona treatment is performed in the presence of nitrogen or carbon dioxide, or nitrogen/air mixtures, or carbon dioxide/air mixtures, with oxygen contents of up to about 15, preferably up to 10, percent by volume at film temperatures in the range of room temperature to about 25° to 50° C. below the softening point of the stretched film.

The discharge frequencies during treatment are in the range of about 0.1 to 1,000 kilocycles/second, preferably in the range from 1 to 100 kilocycles/second.

Suitable coating materials are, for example, high-pressure or low-pressure polyethylenes, polyvinylidene chloride, polyvinyl chloride/polyvinyl acetate copolymers, polyvinyl chloride, and the copolymers or polymer mixtures thereof, which are applied by melt extrusion as a film or from a solution. Especially suitable, however, are aqueous dispersions, the application of an aqueous polyvinylidene chloride copolymer dispersion being especially preferred.

Surprisingly, it has been found that a corona treatment in the presence of nitrogen or carbon dioxide involves an improvement of the adhesion of the coating to the surface of the listed films. This effect also occurs when the oxygen concentration of air is decreased in the corona space, the decrease being achieved in a simple manner by blowing pure or commercial nitrogen or carbon dioxide into the corona space.

Considerable adhesion improvement is additionally achieved by heating the stretched film from room temperature, at which technically useful results also are achieved, to higher temperatures up to about 25° to 50° C. below the softening point of the film to be treated. In accordance with the invention, in the case of biaxially stretched films of isotactic polypropylene, for example, treatment preferably is performed at temperatures in the range of about 75° to 110° C. In the case of polyethylene terephthalate films, temperatures in the range from about 75° to 160° C. are employed.

The temperature may be increased in the usual way, e.g., by an appropriately heated roller mounted in front of the corona space and/or by superposed infrared radiation and/or by preheating the gas blown into the corona space.

The travelling speeds of the films to be treated are not critical for the process of the invention and may range between about 5 and 100 m./min. or more. They can be conventionally adjusted to the conditions necessary in accordance with the invention, such as temperature, treatment intensity, and the like.

The films produced according to the process of the invention are particularly suitable for packaging purposes.

The adhesion improvement to be achieved by heat-sealable coatings, with respect to the known pretreatments in air or chlorine, will be further illustrated by the following examples.

MEASUREMENT OF THE HEAT-SEALING VALUES GIVEN IN THE EXAMPLES

The adhesion is evaluated by the measurement of the heat-sealing values. Sealing is performed for 2 seconds in a Sentinel apparatus at 120° C. under a pressure of 0.4 kg./cm.$^2$. The measurement of the heat-sealing strength is carried out by means of a tension tester, the draw off speed of which is 200 mm./min.

EXAMPLE 1

At a feed speed of 50 m./min., a biaxially stretched 20µ thick polypropylene film was exposed for about 1/50 second to a corona discharge. Nitrogen was intensively supplied into the corona space in such a manner that an oxygen concentration of 10 percent by volume was obtained. The discharge frequency was 5 kilocycles/second, the distance of the electrodes from the film was about 0.5 mm. and the voltage between the electrodes and the roller serving as an antipole was about 6,000 volts.

At a web speed of 30 m./min., the film then was coated with an aqueous polyvinylidene chloride dispersion and dried by means of hot air at 135° C. The applied layer thickness was 1.5µ. Heat-sealing value: 100 g./20 mm.

COMPARATIVE TESTS

The procedure was the same as that described in example 1 except that the corona discharge was effected in a chlorine atmosphere. Heat-sealing value: 130 g./20 mm.

The procedure was the same as that described in example 1 except that the corona discharge took place in an atmosphere of air. Heat-sealing value: 60 g./20 mm.

EXAMPLE 2

The procedure of example 1 was repeated with a 20µ thick polypropylene film with the exception that the film was so heated by a hot roller mounted in front of the corona space that it had a temperature of 80° C. at the time of the corona discharge.

Heat-sealing value: > 160 g./20 mm. (only the values at rupture could be measured).

COMPARATIVE TEST

The procedure of example 2 was performed in air. Heat-sealing value: 70 g./20 mm.

EXAMPLE 3

A biaxially stretched 20μ thick polypropylene film was treated in a laboratory test in a closed system at 80° C. for 1 second at a discharge frequency of 5 kilocycles/second. The treatment was performed in an atmosphere of pure nitrogen obtained by air liquefaction.

After coating with an aqueous polyvinylidene chloride dispersion and drying, the film had a coating of 1.5μ thickness. Heat-sealing value: 90 g./20 mm.

A second film sample was subjected to the same predescribed treatment with the exception that, after evacuation of the discharge zone to about 60 mm. Hg and subsequent filling with nitrogen, the treatment was effected in an atmosphere having an oxygen content of about 4 percent by volume.

Heat-sealing value: 80 to 90 g./20 mm.

COMPARATIVE TEST

The procedure was the same as that described in example 3 except that it was performed in air. Heat-sealing value: 40 to 50 g./20 mm.

The absolute values of example 3 cannot be compared to those of example 2 since, in the case of example 3, the procedure was performed in a laboratory apparatus.

EXAMPLE 4

At a web speed of 50 m./min., a biaxially stretched 20μ thick polypropylene film was exposed to a corona discharge. Nitrogen was intensively passed into the corona space. The discharge frequency was 60 kilocycles/second.

As described in example 1, the film was then provided with a 1.5μ thick polyvinylidene chloride coating from an aqueous dispersion.

Heat-sealing value: 80 g./20 mm.

COMPARATIVE TEST

The procedure was the same as that described in example 4 except that the corona discharge was effected in air.

Heat-sealing value: 40 g./20 mm.

The absolute value of example 4 and that of the comparative test cannot be compared to those of examples 1 and 2 and the comparative tests thereof since, in the case of the latter, the procedure was carried out with a medium-frequency generator and, in the case of the former, with a generator of Type T 600 of Messrs. Deutsche Vetaphone, Hamburg, Germany.

EXAMPLE 5

All films obtained according to examples 1 to 4 and to the comparative tests were exposed for 7 days to a temperature of 25° C. and a relative humidity of 85 percent. No film showed a decrease of the heat-sealing value.

EXAMPLE 6

The procedure was analogous to that of example 1 except that carbon dioxide was used instead of nitrogen.

Coating was then effected at a web speed of 30 m./min. using an aqueous polyvinylidene chloride dispersion and drying was effected with hot air at 135° C. The thickness of the layer applied was 1.5μ. Heat-sealing value: 90 g./20 mm.

EXAMPLE 7

The procedure of example 2 was repeated using a 20μ thick polypropylene film, with the exception that carbon dioxide was passed into the corona space instead of nitrogen.

Heat-sealing value: >140 g./20 mm. (value at rupture).

EXAMPLE 8

The procedure of example 7 was repeated with the exception that coating was effected with an aqueous dispersion of a copolymer of vinyl chloride and vinyl acetate. Heat-sealing value: >140 g./20 mm. (value at rupture).

COMPARATIVE TEST

The procedure was the same as that of example 8 except that the corona discharge was effected at 80° C. in air. Heat-sealing value: 30 g./20 mm.

Similar good results in improving the adhesion according to the process of the invention were obtained with stretched films from copolymers and polymer mixtures containing at least 60 percent by weight, calculated on the total polymer weight, of polypropylene, as well as with polyester films, particularly with polyethylene terephthalate films.

It will be obvious to those skilled in the art that many modifications may be made within the scope of the present invention without departing from the spirit thereof, and the invention includes all such modifications.

What is claimed is:

1. A process for treating the surface of a stretched film of a polyester or polypropylene or copolymers or polymer mixtures of the latter containing at least 60 percent by weight, calculated on the total polymer weight, of propylene, which comprises subjecting the film surface to a corona discharge in an atmosphere consisting essentially of nitrogen or carbon dioxide containing not more than about 15 percent by volume of oxygen, at a film temperature in the range of room temperature to about 25° to 50° C. below the softening point of the stretched film and applying a heat-sealable coating to the treated film.

2. A process according to claim 1 in which the film is isotactic polypropylene.

3. A process according to claim 1 in which the heat-sealable coating comprises a vinylidene chloride polymer.

4. A process according to claim 1 in which the treatment atmosphere contains not more than about 10 percent by volume of oxygen.

5. A process according to claim 1 in which the treatment atmosphere is a mixture of nitrogen and air.

6. A process according to claim 1 in which the treatment atmosphere is a mixture of carbon dioxide and air.

7. A process according to claim 1 in which the corona discharge has a frequency in the range of about 0.1 to 1,000 kilocycles/second.

* * * * *